United States Patent [19]
Stephenson, III

[11] Patent Number: 5,189,522
[45] Date of Patent: Feb. 23, 1993

[54] SYNCHRONIZED THERMAL PRINTING

[75] Inventor: Stanley W. Stephenson, III, Spencerport, N.Y.

[73] Assignee: Eastman Kodak Company, Rochester, N.Y.

[21] Appl. No.: 756,102

[22] Filed: Sep. 6, 1991

[51] Int. Cl.⁵ .......................... H04N 1/23; H04N 1/36
[52] U.S. Cl. .................... 358/296; 358/409; 358/438
[58] Field of Search ............... 358/296, 434, 438, 409

[56] References Cited
U.S. PATENT DOCUMENTS 4,148,066  4/1979  Saylor .
4,459,617  7/1984  Ogawa et al. .
4,918,624  4/1990  Moore et al. .
4,942,477  7/1990  Nakamura .......................... 358/438

Primary Examiner—George H. Miller, Jr.
Assistant Examiner—Scott A. Rogers
Attorney, Agent, or Firm—Raymond L. Owens

[57] ABSTRACT

An imaging apparatus contains an image capture device having image capturing means and video encoding means, and an image printer. Electronic components in the image capture device produce image and timing signals. The image and timing signals bypass the video encoding means so that the printer does not internally require a video signal decoder. The signals received by the printer are slow speed signals which can be processed as received without need for an internal memory.

3 Claims, 3 Drawing Sheets

SYNCHRONIZED THERMAL PRINTING

FIELD OF INVENTION

This invention relates generally to electronic imaging and, more particularly, relates to an apparatus and method for electronically capturing an image, outputting a video signal and generating printer data and timing signals for operating an image printer in synchronization with the data and timing signals.

BACKGROUND OF THE INVENTION

This invention relates to a digital image capture and printing system such as one employing a color thermal printer. In such systems, a hand held electronic image capture device stores images on magnetic or semiconductor storage devices. The images are typically output in a standard video image format. The thermal printers associated with such systems capture the video image, digitize the image into memory in the printer, and then thermally print the image.

FIGS. 1 and 2 illustrate conventional image capture and printing systems. In typical electronic imaging systems, the imaging system comprises two portions. The first portion is an image capture device and the second portion is a thermal printing device. In these systems, the image capture device captures the image, typically using a CCD imager, and stores the image as either a magnetic recording or within a semiconductor memory. These devices typically incorporate additional circuitry that provides for video output of the image. A complimentary part of these systems may also include a thermal printer that allows for a hard copy of the electronically captured image to be printed.

FIG. 1 illustrates a conventional imager consisting of an array of CCD elements that convert an optical image into an electronic signal. The CCDs are strobed periodically to off-load the image in a series of frames. The data is then converted into a storage format and the image is stored magnetically. The CCD image is saved as luminance and chrominance data and stored as flux changes on a rotating magnetic disk, or as a helical scan on magnetic tape. The associated printer receives a video signal compatible with one of several standards of video output. In the magnetic storage system, the rotation of the disk and the capture of the image are time synchronized with the video frame transmission rate of 1/30 of a second.

FIG. 2 illustrates a conventional image capture and printing system wherein an array of semiconductor memory chips is put on a card. The capacity of these chips is such that the many images can be captured if the digital image is stored in a compressed or encoded format. In both the magnetic and semiconductor storage devices, the images must be reformatted to provide the final video output. A typical image generation rate for a conventional thermal printer is several orders of magnitude slower than the video image, and the thermal printing systems are digital systems. Because of these factors, current thermal printers capture analog video signals and stores the resultant image in digital memory within the printer. In certain systems, the cost of the video capture and storage elements represents the majority of the cost of the printer. Accordingly, it will be appreciated that it would be highly desirable to have a thermal printer which does not need the video capture and storage elements and would therefore be less costly.

A feature of the conventional image capture and printing systems is the video output which allows the captured image to be viewed on a video monitor. When a desired image is viewed the image can be made into a hard copy using the thermal printer. A thermal printer has an advantage over other image printing equipment such as facsimile machines, laser printers, and conventional printers used primarily for text because a high quality, continuous tone image can be generated with low cost equipment. Problems exist with conventional printers such as facsimile machines, laser printers, and matrix printers as disclosed in U.S. Pat. No. 4,459,617 which issued Jul. 10, 1984 to Mutsuo Ogawa, Shingo Yamaguchi and Shigeru Katsuragi for Facsimile Reception Apparatus, U.S. Pat. No. 4,918,624 which issued Apr. 17, 1990 to James M. Moore and James F. Leighton for Vector Generator Scan Converter and U.S. Pat. No. 4,148,066 which issued Apr. 3, 1979 to Richard Saylor for Interface for Enabling Continuous High Speed Role Grabbing Video Display with Real Time Hard Copy Printout Thereof.

U.S. Pat. No. 4,459,617 discloses a system for the transfer of video data to a printer by employing an uninterrupted video data transfer path from the decoder to the printer without the intermediary of a buffer memory. The facsimile reception apparatus processes video data using a microcomputer. When one line of decoded video data is stored in a random access memory of the microcomputer, the video data is transferred to a printing section through a microprocessor a plurality of bits at a time. The printing section reproduces a plurality of bits of input video data and then delivers an interruption signal to the microprocessor to request transfer of another plurality of bits of video data thereto. Thus, the microprocessor functions to match the transmission rate of the incoming video data to the printing rate, the same as other prior art systems illustrated in FIGS. 1 and 2 wherein the video input is converted from an analog signal to a digital signal and stored in memory.

U.S. Pat. No. 4,918,624 discloses a printer interface which acts as a buffer to equalize the rate of the printer and the reading rate of the output scanner. The vector generator scan converter thus functions as the prior art systems illustrated in FIGS. 1 and 2 wherein the video input is converted from an analog signal to a digital signal and stored in memory so that the video rate can be matched to the printer rate.

U.S. Pat. No. 4,148,066 discloses a printer interface to enable a continuous direct video display while providing real time hard copy printing. The printer is controlled by a microprocessor which can match the printing rate with the incoming video rate as is done is the prior art systems illustrated in FIGS. 1 and 2.

As mentioned, the video capture and storage elements can typically represent the majority of the cost of a thermal printer and can similarly represent a majority of the cost of facsimile machines and conventional printers as well. Accordingly, it will be appreciated that it would be highly desirable to provide an image printer that is free of expensive video capture and storage elements.

Conventional image capture and printing systems have an image capture portion which captures an image and stores that image in memory in a data compressed format. A data compressed format is a digital format. The compressed data is removed from memory and expanded and converted to an analog video signal. It is highly desirable to use the digital formatted signal within the image capture portion of the system to drive the image printer; however, the image printer portion of the system expects to receive an analog video signal. Accordingly, it will be appreciated that it would be highly desirable to have an image capture and printing system wherein the image printer receives a digital signal and wherein the image capture portion of the system delivers a digital signal to the printer thereby eliminating the need for video capture and storage components within the image printer.

SUMMARY OF THE INVENTION

The present invention is directed to overcoming one or more of the problems set forth above. Briefly summarized, according to one aspect of the present invention, an imaging apparatus comprises an image capture device having image capturing means and video encoding means, and an image printer free of image capturing means and video decoding means. Electronic components in the image capture device produce image and timing signals and provide a slow speed readout of the image and timing signals to the image printer.

The image and timing signals bypass the video encoding means so that the printer does not internally require a video signal decoder. The lack of an internal video signal decoder makes the printer a much simpler device. The signals received by the printer are slow speed signals which can be processed as received without need for an internal memory. The lack of an internal memory makes the printer a less costly device.

According to another aspect of the invention, an imaging apparatus comprises an image capture device having video capture means for capturing a desired image, video encoding means for producing a video output signal, image storage means for storing the captured image, and menas for bypassing the video encoding means and producing image and timing signals. A thermal printer is included that is free of any video capture and image storage means. Circuitry is provided for delivering the image and timing signals to the thermal printer. The thermal printer deposits donor dye on a dye receiver synchronously in response to receipt of the image and timing signals to produce a thermal print of the captured image.

The image capture device produces a first output signal that provides video formatted data representing the captured image, and produces a second output signal that provides printer formatted image and timing data representing the captured image. The printer formatted image and timing data is delivered to the thermal printer, and the thermal printer deposits donor dye onto a dye receiver synchronously with the image and timing data being transferred from the image capture device.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
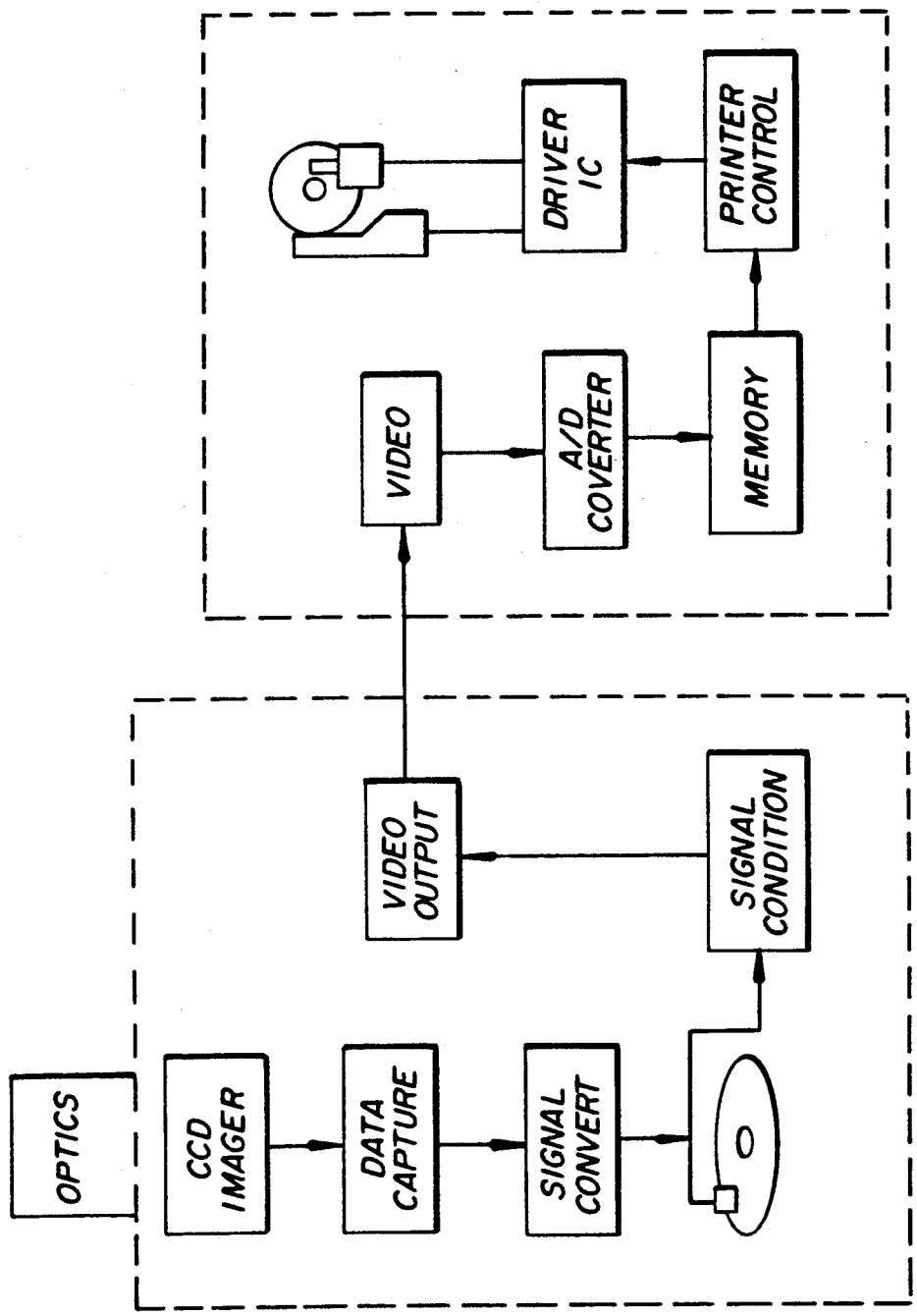
FIG. 1 is a simplified block diagram of conventional imaging apparatus illustrating an image capture section and an image print section that receives an analog video signal, digitizes the signal with an analog to digital converter, and stores the digital data in memory.
Figure 2:
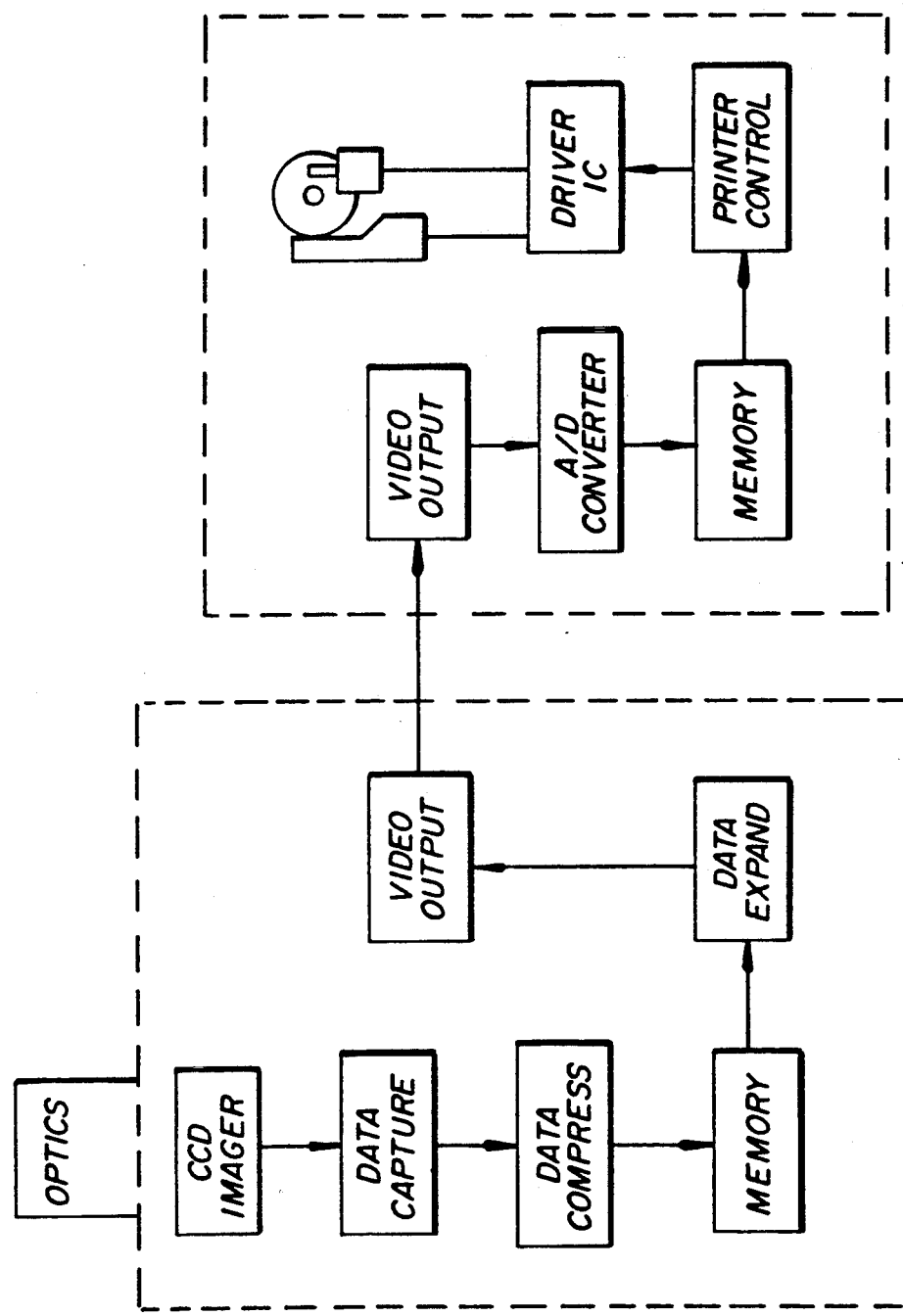
FIG. 2 is a simplified block diagram of conventional imaging apparatus similar to FIG. 1, but illustrating an image capture section with data compression.
Figure 3:
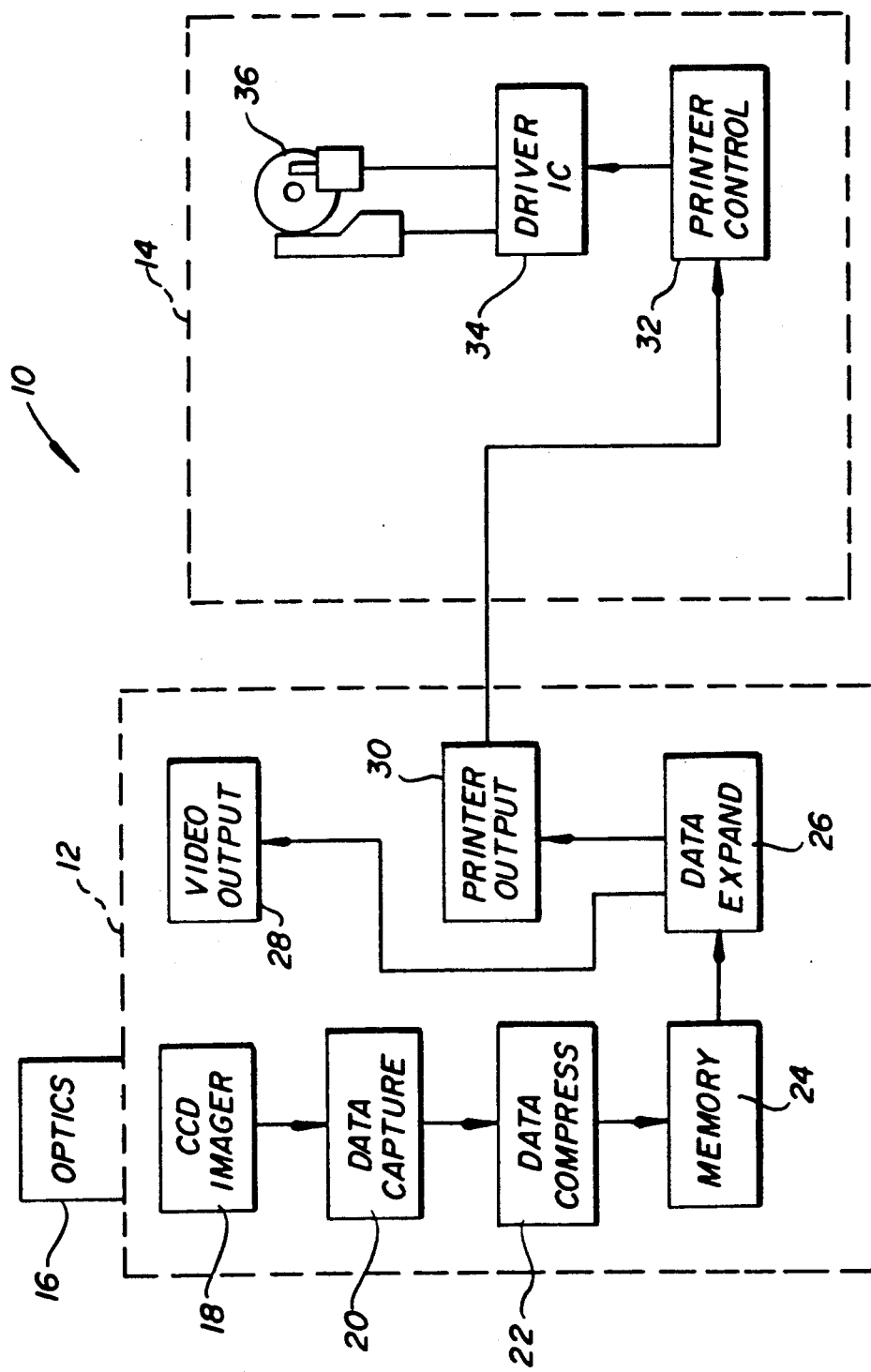
FIG. 3 is a simplified block diagram of a preferred embodiment of imaging apparatus illustrating an image capture section and a simplified image print section in accordance with the present invention.

Referring to FIG. 3, an imaging system 10 is shown in block form with one block representing an image capture portion 12 and the other block representing the image printer portion 14. The image capture portion 12 contains an optical element 16 for directing light from a desired object onto an image capturing device, such as a charge-coupled device ("CCD") imager 18. The CCD imager 18 contains an array of CCD elements that convert the image from the optical input 16 into an electrical signal. The output signal from the CCD imager 18 is fed to a data capture circuit 20 that delivers a data signal representing the luminance and chrominance for the image viewed.

A data compression module 22 receives the luminance and chrominance data and compresses or encodes the data for storage in the memory 24. The memory 24 may be constructed of an array of semiconductor memory chips on a card whose capacity is such that many images can be captured when the digital image is stored in a compressed or encoded format. The compressed data from the memory 24 is received by a data expander 26 which reformats the data and provides a final video signal for the video output 28. The data expander 26 can reformat the image into any standard video signal, a common one being a video frame transmission rate of 1/30 of a second. On the other hand, the data expander 26 also outputs a slower signal to the printer output 30. For the printer 14, the frame transmission rate is on the order of about 10-30 seconds per frame which is a much lower rate than the video transmission rate.

The image printer, which is illustrated as a colored thermal printer 14, has a printer control section 32 and a driver section 34 for driving the printhead 36. Then printer output 30 from the image capture section 12 is input directly to the printer control 32 and the image printer portion 14 of the imaging system 10. Because the signal input to the printer portion 14 is already formatted and transmitted at a rate acceptable to the printer, there is no need to convert or store the incoming data. Therefore, the video capture and storage components are not required in the image printer 14.

Operation of the present invention is believed to be apparent from the foregoing description, however, a few words will be added for emphasis. Within the image capture portion 12 of the imaging system 10, an electronic module 30 disposed just below the video output generator 28 provides a slow speed readout of the digital image and timing signals to the thermal printer 14. The printer 14 does not contain video capture or image storage circuitry but deposits dye on thermal material synchronously with the data being transferred from the image capture device 12.

The present invention improves contentional imaging systems by eliminating the video capture and digital image storage within the printer 14 and improves image quality through a bypass of the video encoding circuitry 28.

The present system is composed of an electronic image capture device 12 generating video output signals and a thermal dye printer containing thermal dye transfer media that generates a near continuous tone image by successive application of dye to a dye receiver. There is capability within the system 10 for the printing of digital image record concurrent with the transfer of the image to the printer 14.

Circuitry is disposed within the image capture device 12 such that the circuity transfers the image information for each dye patch at a speed consistent with the thermal dye transfer process. The signals consist of a color record and synchronizing signals to transfer the color information during the printing process. Controlled electronics within the thermal transfer are arranged to provide synchronization of the transfer of the thermal dye to a dye receiving member with the transfer of color plane information from the digital image capture device. The electronics contain sufficient circuitry to translate the transferred image from a transmission format to a thermal dye record.

The present invention consists of circuitry within an electronic image capture device that allows the transfer of an electronically formatted image to a printer in a manner that allows for synchronization of the dye transfer process to the transfer of the electronic image. The present invention allows for the elimination of video capture and storage components by interface circuitry disposed within the image capture device to allow for a slow transfer of data between the image capture device and the thermal printer. Many ways of implementation are possible.

A typical method is to synchronize a line of printer data with a line of video output data. The printer output circuitry signals the printer to prepare for the transfer of the first color record. After reinitializing the mechanical elements, the printer signals that it is ready to receive and print the first dye patch. The capture device then transfers a color plane of the image to the printer. Optimally, a clock signal from the image capture device allows for accurate print data transfer between the two devices. Circuitry within the printer captures the data, loads the data into the printer driver, and initiates the printing of the first line.

In one type of thermal printer that prints colored images, a carrier contains a repeating series of spaced frames of different colored heat transferable dyes. The carrier is disposed between a receiver, such as coated paper, and a print head formed of a plurality of individual heating elements. When a particular heating element is energized, it is heated and causes dye from the carrier to transfer to the receiver. The density or darkness of the printed color dye is a function of the energy delivered from the heating element to the carrier. Thermal dye transfer printers offer the advantage of true continuous tone dye density transfer. This result is obtained by varying the energy applied to each heating element, yielding a variable dye density image pixel on the receiver.

The carrier often includes a repeating series of spaced yellow, magenta and cyan dye frames. First, the yellow frame and the receiver are moved to be positioned under the print head and as they are advanced, the heating elements are selectively energized to form a row of yellow image pixels in the receiver. This process is repeated until a yellow dye image is formed in the receiver. Next, the magenta frame is moved under the print head and the receiver is also moved under the print head. Both the receiver and the magenta frame are moved as the heating elements are selectively energized and a magenta image is formed superimposed upon the yellow image. Finally, as the cyan dye frame and the receiver are moved under the print head, the heating elements are selectively energized and a cyan dye image is formed in the receiver superimposed upon the yellow and magenta dye images. These yellow, magenta and cyan dye images combine to form a colored image.

Additionally, components could be incorporated into the printer that would color correct the information. After the first color plane is transmitted, the printer signals the image capture device to pause until the printer has mechanically initialized for the next color patch. When the printer is ready for the next color patch, the capture device transmits the second color plane. The process would continue until a complete image was generated.

The process would work best with the semiconductor memory storage device. In this instance, the data could be transferred digitally at a rate significantly lower or slower than the video output rate. Because the data is already in digital form, the quality loss incurred by conversion to a video and back from video space is eliminated.

It can now be appreciated that there has been present an imaging apparatus including an image capture device for capturing a desired image and a thermal printer for producing a hard copy of the captured image. The image capture device produces a first output signal providing video formatted data and a second output signal providing printer formatted image and timing data representing the captured image. The video signal is such that an image is transmitted in 1/30 of a second; whereas, the printer signal is slow to account for the printing rate of the printer at about 10 to 30 seconds per color plane. Consequently, means are provided for delivering the printer formatted image and timing data to the thermal printer so that the thermal printer deposits donor dye onto a dye receiver synchronously with the image and timing data being transferred from the image capture device.

While the invention has been described with particular reference to the preferred embodiments, it will be understood by those skilled in the art that various changes may be made and equivalents may be substituted for elements of the preferred embodiment without departing from invention. In addition, many modifications may be made to adapt a particular situation and material to a teaching of the invention without departing from the essential teachings of the present invention. For example, while the invention has been described with reference to a CCD imager, the invention will work equally well regardless of the particular method used to capture the image. One advantage of the invention is the elimination of analog video capture circuitry and image storage in the image printer. Complete image memory or complete color plane memory is not necessary; it is sufficient if multiple lines of buffer memory exist but inclusion of the entire color plane is not now required.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed is:

1. An imaging apparatus, comprising:
   an image capture device having image capturing means and video encoding means;
   means, in said image capture device, for producing digital image and timing signals, said image and timing signals bypassing said video encoding means;
   an image printer free of image capturing means and video decoding means; and
   means for providing a slow speed readout of the digital image and timing signals to said image printer.

2. An imaging apparatus, comprising:
   an image capture device having image capture means for capturing a desired image, video encoding means for producing a video output signal, and image storage means for storing said captured image;
   means, associated with said image capture device, for bypassing said video encoding means and producing digital image and timing signals;
   a thermal printer free of any video capture and image storage means; and
   means for delivering said digital image and timing signals to said thermal printer, said thermal printer depositing donor dye on dye receiver material synchronously in response to receipt of said digital image and timing signals.

3. An imaging apparatus, comprising:
   an image capture device for capturing a desired image;
   a thermal printer for producing a hard copy of the captured image;
   means, associated with said image capture device, for producing a first output signal providing video formatted data representing said captured image;
   means, associated with said image capture device, for producing a second output signal providing printer formatted image and timing data representing said captured image; and
   means for delivering said printer formatted image and timing data to said thermal printer, said thermal printer depositing donor dye onto a dye receiver synchronously with the image and timing data being transferred from said image capture device to said thermal printer.

* * * * *